United States Patent [19]
Nakadai et al.

[11] Patent Number: 5,268,766
[45] Date of Patent: Dec. 7, 1993

[54] FACSIMILE APPARATUS WITH TWO DIFFERENT SIZED PAPER SUPPLY ROLLS HAVING TIMER/COUNTER TO CHOOSE PRIMARY SUPPLY ROLL TO PREVENT CURLING

[75] Inventors: Yoshikazu Nakadai, Chiba; Eiji Takenaka, Isehara, both of Japan

[73] Assignee: Ricoh Company, Ltd., Tokyo, Japan

[21] Appl. No.: 550,941

[22] Filed: Jul. 11, 1990

[30] Foreign Application Priority Data

Jul. 19, 1989 [JP] Japan .................. 1-85270[U]

[51] Int. Cl.⁵ ............... H04N 1/21; G01D 15/24; B41J 15/18; B41J 11/52
[52] U.S. Cl. .................. 358/296; 358/304; 346/136; 400/608.3; 400/613; 400/621
[58] Field of Search .......... 346/24, 76 PH, 136; 358/296, 304; 400/607, 607.2, 608, 608.3, 608.4, 611, 613, 614, 621

[56] References Cited

U.S. PATENT DOCUMENTS

| | | | |
|---|---|---|---|
| 4,855,839 | 8/1989 | Saito | 358/296 |
| 4,868,674 | 9/1989 | Nakamura et al. | 358/296 |
| 4,926,191 | 5/1990 | Takenaka et al. | 346/136 X |
| 4,926,358 | 5/1990 | Tani et al. | 355/311 X |
| 4,963,988 | 10/1990 | Baba | 358/296 |
| 4,969,016 | 11/1990 | Kudoh | 358/304 X |

FOREIGN PATENT DOCUMENTS

64-81463 3/1989 Japan .

Primary Examiner—Benjamin R. Fuller
Assistant Examiner—Eric Frahm
Attorney, Agent, or Firm—Oblon, Spivak, McClelland, Maier & Neustadt

[57] ABSTRACT

A facsimile apparatus which includes a control part, first and second rolls of first and second recording sheets of different sizes, a platen roller being driven to transport a recording sheet selectively being fed from either the first roll or the second roll, a thermal recording head being provided in contact with the platen roller for carrying out thermal recording, a first feed roller being driven to transport the first recording sheet from the first roll to the platen roller, and a second feed roller being driven to transport the second recording sheet from the second roll to the platen roller. The facsimile apparatus further includes a sheet size sensing part for sensing a sheet size from a sheet size code included in a prescribed control signal being provided each time transmission data when received from an external facsimile terminal, and a counter part for counting the number of each of first and second sheet size occurrences at the sheet size sensing part, so that a leading edge of either the first recording sheet or the second recording sheet, whichever has a greater number of the sheet size occurrences obtained by the counter part, is preferentially placed on the platen roller.

4 Claims, 5 Drawing Sheets

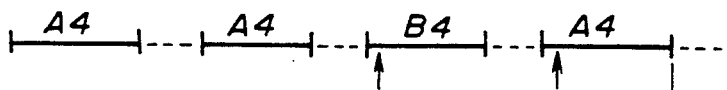
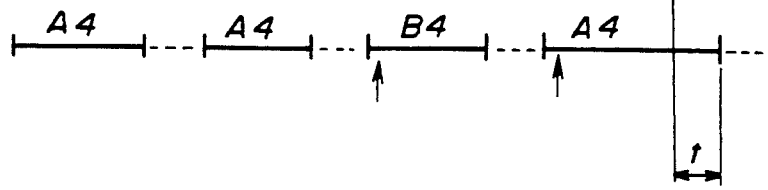
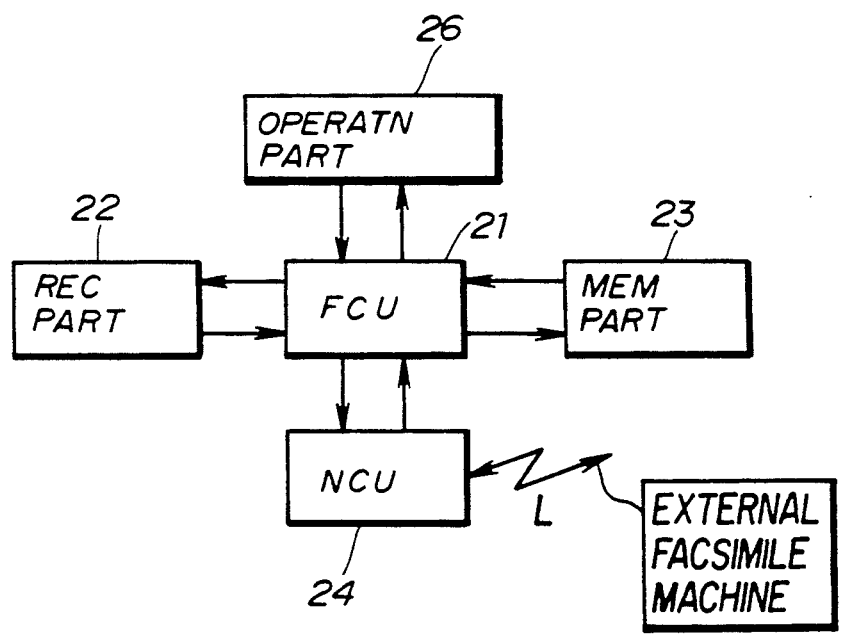

CURL

FACSIMILE APPARATUS WITH TWO DIFFERENT SIZED PAPER SUPPLY ROLLS HAVING TIMER/COUNTER TO CHOOSE PRIMARY SUPPLY ROLL TO PREVENT CURLING

BACKGROUND OF THE INVENTION

The present invention generally relates to a facsimile apparatus, and more particularly to a facsimile apparatus which is capable of installing two rolls of recording sheet.

In a conventional facsimile apparatus capable of installing two rolls of first and second recording sheets of different sizes (for example, A4 and B4), a leading edge of the second recording sheet is placed at a prescribed position along a sheet transport path between a platen roller and a feed roller, and a leading edge of the first recording sheet is placed on the platen roller. The platen roller is a place for a recording sheet to wait in a ready state for receiving a call. When two rolls of first and second recording sheets of different sizes are newly installed in the facsimile apparatus of this type, the positions of the leading edges of the recording sheets being placed within the facsimile apparatus and the sizes of the first and second recording sheets are sensed by sheet sensors in sheet transport paths of the facsimile apparatus and the sensed information is stored in a control part of the facsimile apparatus. And, the facsimile apparatus of the type discussed above is usually equipped with an automatic sheet cutter, and when a roll of recording sheet is newly installed the facsimile apparatus performs initialization of the recording sheet of that roll, which includes a cutting of a leading edge of such a recording sheet by the automatic sheet cutter to form a proper cut edge of the recording sheet before operation. The cutting of a leading edge of recording sheet is carried out partially because it is desired that no paper jam occurs in a cutter area and in an ejection area, and a proper top margin of a first page and a suitable recording on paper are set.

However, such a facsimile apparatus in which two rolls of recording sheets of different sheet sizes are installed may often experience a sheet size change especially when either of the two rolls of recording sheet is exchanged or when the sheet size must be used to meet the operating condition of the facsimile apparatus. When the size of recording sheet being placed on the platen roller of the facsimile apparatus differs from that which is specified by an external facsimile terminal when a call is received, it is required for the facsimile apparatus to carry out a sheet size switching from the first sheet size to the second sheet size or vice versa. During the sheet size switching, a telephone line which is connected to the facsimile apparatus is in a "hold" state, which causes a loss or delay of communication time and unnecessarily increases the cost for telephone line use. In addition, in the case of the conventional facsimile, the initialization of the recording sheet is usually performed only when a sheet size change is made. Accordingly, either the first recording sheet or the second recording sheet placed in the facsimile apparatus, whichever is less frequently used, continues to stay at a place amid the sheet transport path between the platen roller and the feed roller without being used for recording, and in most cases for a long duration. Such a recording sheet is likely to be curled at the leading edge as shown in FIG. 7. When such a recording sheet having a curled edge must be used, it is very likely to cause a paper jam to occur at the inlet or outlet of the automatic sheet cutter, and otherwise the recording sheet sticks to the platen roller while it is recorded.

SUMMARY OF THE INVENTION

Accordingly, it is a general object of the present invention to provide a novel and useful facsimile apparatus in which the aforementioned problems are eliminated.

Another and more specific object of the present invention is to provide a facsimile apparatus which comprises a control part, first and second rolls of first and second recording sheets of different sheet sizes, a platen roller being driven in conjunction with recording by the control part to transport a recording sheet selectively being fed from either the first roll or the second roll, a thermal recording head being provided in contact with the platen roller for carrying out thermal recording on the recording sheet, a first feed roller being driven by the control part to transport the first recording sheet from the first roll to the platen roller, and a second feed roller being driven by the control part to transport the second recording sheet from the second roll to the platen roller, so that a leading edge of one of the two first and second recording sheets is placed at a prescribed position of the platen roller when the two rollers are newly placed in the facsimile apparatus, and a leading edge of the other of the two recording sheets is placed either at a prescribed position between the platen roller and the first feed roller or at a prescribed position between the platen roller and the second feed roller. The facsimile apparatus comprises a sheet size sensing part for sensing a sheet size from a sheet size code included in a prescribed facsimile communication control signal being received together with data when transmitted from another facsimile terminal to the facsimile apparatus, and a counter part for counting a number of first recording sheet size occurrences by the sheet size sensing part and for counting a number of second recording sheet size occurrences by the sheet size sensing part. According to the present invention, it is possible, when the facsimile apparatus receives a call from an external facsimile terminal, to first place one roll of recording sheet having a sheet size being more frequently used than the sheet size of the other roll, on the platen roller of the facsimile apparatus. Therefore, it is possible to reduce an unnecessary time delay due to sheet size switching by the facsimile apparatus before starting data transmission, thus allowing the reduction of the communication cost.

Still another object of the present invention is to provide a facsimile apparatus which comprises a control part, first and second rolls of first and second recording sheets, a platen roller being driven in conjunction with recording by the control part to transport a recording sheet selectively being fed from either the first roll or the second roll, a thermal recording head being provided in contact with the platen roller for carrying out thermal recording on the recording sheet, a cutter being provided for cutting a leading edge of the recording sheet being fed from the platen roller, a first feed roller being driven by the control part to transport the first recording sheet from the first roll to the platen roller, and a second feed roller being driven by the control part to transport the second recording sheet from the second roll to the platen roller. The facsimile apparatus comprises an initialization part for initializing a new recording sheet newly placed in the facsimile apparatus for exchange and putting the new recording sheet in a ready state for awaiting a call from another facsimile terminal, and a timer part for measuring a first time interval for the first recording sheet to continue to wait in a ready state and for measuring a second time interval for the second recording sheet to continue to wait in a ready state, wherein the facsimile apparatus carries out initialization of either the first recording sheet or the second recording sheet, whichever whenever the corresponding first or second time interval thus measured by the timer means exceeds a prescribed time period. According to the present invention, it is possible to perform the initialization of recording sheet at given time intervals, the recording sheet remaining unused for recording and waiting in a ready state for a call from an external facsimile terminal for an excessively long time period, for preventing the recording sheet from being curled at its leading edge. The sheet edge curl is very likely to cause a paper jam or other problems to occur at the cutter part of the facsimile apparatus.

Other objects and further features of the present invention will be apparent from the following detailed description when read in conjunction with the accompanying drawings.

BRIEF DESCRIPTION OF THE DRAWINGS

FIG. 3A is a timing chart of sheet transport and sheet size switching according to the present invention;

FIG. 3B is a timing chart of sheet transport and sheet size switching of a conventional facsimile apparatus;

FIG. 4 is a block diagram of a modified control part of another embodiment of the present invention;

DESCRIPTION OF THE PREFERRED EMBODIMENTS

First, referring to FIG. 1, a description will be given of a recording part of a facsimile apparatus 1 according to the present invention.

Figure 1:
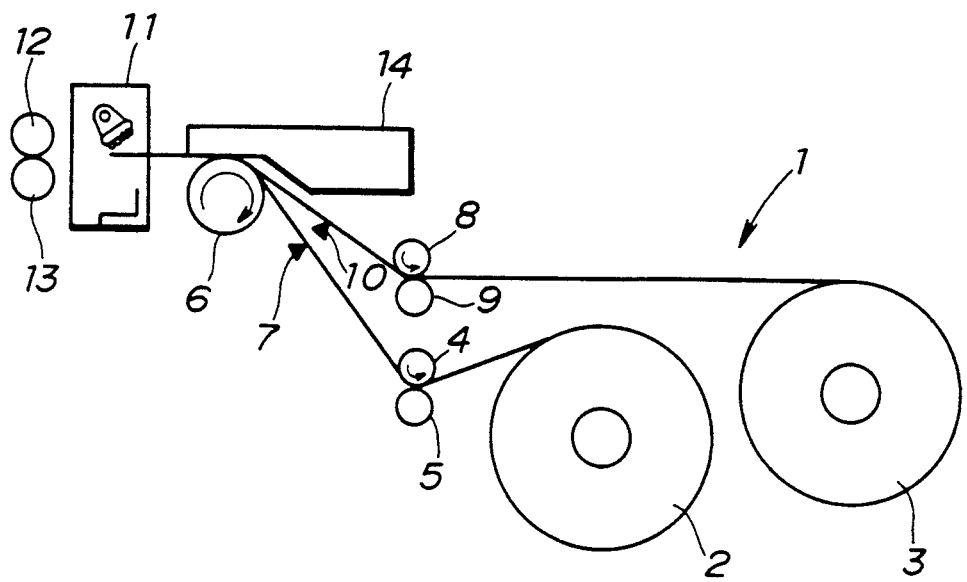
FIG. 1 is a schematic diagram showing a recording part of an embodiment of a facsimile apparatus according to the present invention.

As shown in FIG. 1, the facsimile apparatus 1 has two rolls of first and second recording sheets 2, 3. The first recording sheet 2 is fed from its roll to a place between a first feed roller 4 and a pressure roller 5, and is further fed by forward rotation of the first feed roller 4 (rotation of roller 4 in a clockwise direction in FIG. 1), which is driven by a suitable driving means (not shown), to a prescribed position (not shown) in a first sheet transport path which extends from the first feed roller 4 to a platen roller 6. A first sensor 7 is provided at a suitable position along the first sheet transport path for sensing a size as well as a sheet-edge position of the first recording sheet 2, the first sensor 7 being made from, for example, a photocoupler or the like.

Meanwhile, the second recording sheet 3 is fed from its roll to a place between a second feed roller 8 and a pressure roller 9, and is further fed by forward rotation of the second feed roller 8 (rotation of roller 8 in a clockwise direction in FIG. 1), which is driven by a suitable driving means (not shown), to the platen roller 6. A second sensor 10 is provided at an appropriate position in a second sheet transport path, which extends from the second feed roller 8 to the platen roller 6, for sensing a size as well as a sheet-edge position of the second recording sheet 3. The second sensor 10 is made from, for example, a photocoupler or the like.

At the starting of recording, either the first recording sheet 2 or the second recording sheet 3 is selectively supplied to the platen roller 6, and the platen roller 6 is driven by a suitable driving means (not indicated) to send the sheet 2 or 3 to a position of a cutter 11 and to a position between ejection rollers 12 and 13. A thermal recording head 14 is provided in contact with the platen roller 6 to carry out thermal recording of the sheet 2 or 3 which is held between the thermal recording head 14 and the platen roller 6. The thermal recording head 14 has a plurality of thermal recording elements which are arranged along an axial direction of the platen roller 6. The thermal recording elements reproduce transmitted information on the recording sheet 2 or 3 by heating in accordance with picture elements from the transmitted information. The cutter 11 is provided at a position between the platen roller 6 and the ejection rollers 12, 13 for cutting a leading edge of the recording sheet 2 or 3. The driving of the feed rollers 4, 8, the platen roller 6, the cutter 11 and the ejection rollers 12, 13 is controlled by a control part (not shown in FIG. 1) of the facsimile apparatus 1. Electric signals from the above described sensors 7, 10 are inputted to the control part of the facsimile apparatus 1.

Figure 2:
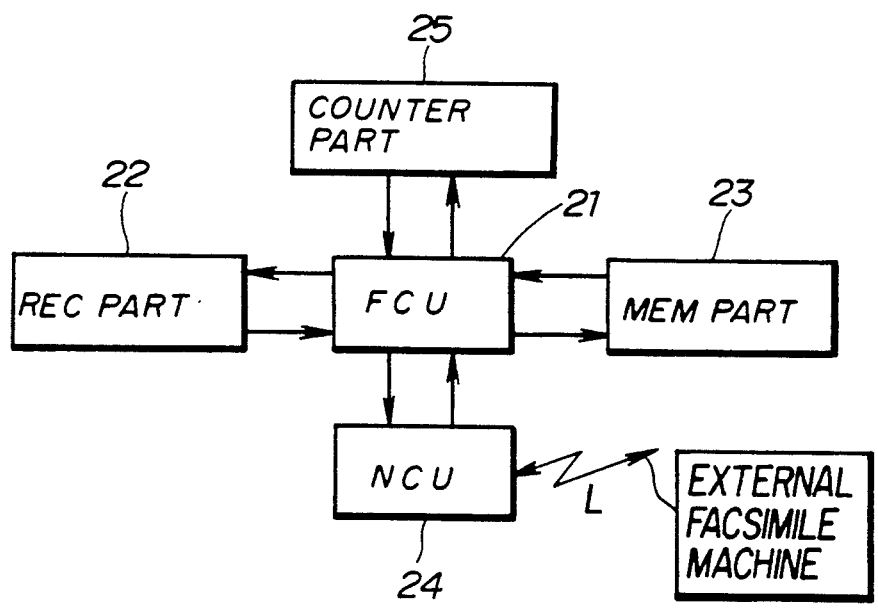
FIG. 2 is a block diagram of a control part of the facsimile apparatus according to the present invention.

Referring next to FIG. 2, a description will be given of the control part of the facsimile apparatus 1 according to the present invention.

As shown in FIG. 2, the facsimile apparatus 1 includes a facsimile control unit (FCU) 21, a recording part 22, a memory part 23, a network control unit (NCU) 24, and a sheet size occurrence counter 25. The FCU 21 carries out sheet transport control and sheet size switching control of a recording sheet as well as other several facsimile processings and functions in accordance with commands from an operating program which is stored in the memory part 23. The recording part 22 corresponds with the recording part shown in FIG. 1. The memory part 23 basically comprises a read only memory (ROM) which stores an operating software of the facsimile apparatus 1 as well as a program which executes the recording sheet transport and sheet size switching procedures relating to the present invention. The NCU 24 is connected to a telephone line L, and the NCU 24 executes necessary facsimile communication procedures for communicating with an external facsimile terminal 27 when a call is received. In addition, the NCU 24 detects a sheet size code to select a sheet size of a primary recording sheet which is preferentially placed on the platen roller 6. The sheet size code is included in a facsimile communication control signal which is received together with transmitting data each time it is received from the external facsimile terminal. The sheet size occurrence counter 25 counts or totals the number of sheet size occurrences given by the NCU for each of the first and second recording sheets.

Next, a description will be given of the sheet transport and sheet size switching operations of the facsimile apparatus 1 when in a ready state for receiving a call from an external facsimile terminal.

In a ready state of the facsimile apparatus 1 with two rolls of first and second recording sheets being installed, it is possible to determine a primary recording sheet selected from either the first recording sheet 2 or the second recording sheet 3, whichever has a greater number of sheet size occurrences given by the NCU 24. The primary recording sheet is a sheet that should preferentially be placed on the platen roller 6 when a call is received from an external facsimile terminal. And, it is possible to automatically place a leading edge of thus selected primary recording sheet at a prescribed position of the platen roller 6. In the above discussed embodiment, the first recording sheet 2 of A4 size and the second recording sheet 3 of B4 size are used. The FCU 21 counts up the number of sheet size occurrences stored in the counter 25 for each of the first and second sheet size occurrences given by the NCU 24 which senses a sheet size code included in a prescribed facsimile communication control signal being provided each time transmission image data is received from an external facsimile terminal. The FCU 21 in a waiting condition determines such a primary recording sheet from the two first and second recording sheets 2, 3, whichever has a greater number of sheet size occurrences given by the NCU 24.

Now, assume that the number of sheet size occurrences for the first recording sheet 2 is greater than that for the second recording sheet 3. In this case, the facsimile apparatus 1 allows the leading edge of first recording sheet 2 to be first placed on the platen roller 6, the leading edge of second recording sheet 3 remaining at a place in the sheet transport path between the platen roller 6 and the second feed roller 8. A description of the operation of the facsimile apparatus 1 shown in FIG. 1 will be given below.

When the leading edge of first recording sheet 2 is on the platen roller 6 and the A4 size is specified by the external facsimile terminal, the FCU 21 allows the first feed roller 4 and the platen roller 6 to rotate at a prescribed speed in the forward direction to transport the first recording sheet 2 to the cutter 11 while the first recording sheet 2 is subjected to recording of transmission image data by the thermal recording head 14. After the recording is finished, the first recording sheet 2 is fed by the ejection rollers 12, 13 to a recording end position and the rear edge of the last page is cut away by the cutter 11. After the cutting, the FCU 21 allows the platen roller 6 and the first feed roller 4 to rotate in a reverse direction (counterclockwise direction in FIG. 1) so that a new leading edge of first recording sheet 2 is placed on the platen roller 6, then the NCU 24 is disconnected from the telephone line L and the facsimile apparatus is again put in a ready state for receiving a next call.

When the leading edge of first recording sheet 2 is placed on the platen roller 6 and the B4 size is specified by the external facsimile terminal, the FCU 21 allows the first feed roller 4 and the platen roller 6 to rotate in the reverse direction so that the leading edge of first recording sheet 2 is fed back to a prescribed position along the sheet transport path between the platen roller 6 and the first feed roller 4. Next, the FCU 21 allows the second feed roller 8 and the platen roller 6 to rotate at a prescribed speed in the forward direction so that the leading edge of second recording sheet 3 is placed on the platen roller 6, and the second recording sheet 3 is fed toward the cutter 11 while the second recording sheet 3 is subjected to recording of transmission image data by the thermal recording head 14. When the recording is finished, the second recording sheet 3 is fed by the ejection rollers 12, 13 to an recording end position and the rear edge of the last page is cut away by the cutter 11 and the recorded sheet is ejected out of the facsimile apparatus 1. After the cutting, the FCU 21 allows the platen roller 6 and the second feed roller 8 to rotate in the reverse direction so that a new leading edge of second recording sheet 3 is placed on the platen roller 6, then the NCU 24 is disconnected from the telephone line L. Immediately after the disconnection from the telephone line L, the FCU 21 allows the second feed roller 8 and the platen roller 6 to rotate in the reverse rotation as well as enables the first feed roller 4 and the platen roller 6 to rotate in the forward direction so that the leading edge of first recording sheet 2 is placed on the platen roller 6 and the leading edge of second recording sheet 3 is placed at a prescribed position in the sheet transport path. Then, the facsimile apparatus is returned to the ready state, awaiting a call from an external facsimile terminal.

Next, a description will be given of the timing of the recording and sheet size switching at the place of the platen roller 6 with respect to the first recording sheet 2 (A4 size) and the second recording sheet 3 (B4 size), by referring to FIGS. 3A and 3B. FIG. 3A shows the timing of the recording and sheet size switching according to the present invention and FIG. 3B shows the timing of the recording and sheet size switching according to the conventional apparatus. In FIGS. 3A and 3B, a solid line indicates the timing of the data receiving and sheet recording on the platen roller 6 while the recording sheet is transported along the sheet transport path, and a dotted line indicates the timing of the ready state of the facsimile apparatus awaiting a call from an external facsimile apparatus. In a case of the facsimile apparatus according to the present invention, a recording on B4 size paper is carried out as shown in FIG. 3A (during the interval labelled B4 and indicated by an arrow). The next data transmission required recording on A4 size paper (also indicated by an arrow). Switching the sheet size from B4 to A4 size (a preferential sheet size in this case is, for example, A4 size) is performed immediately after the transmission data receiving and sheet recording on a B4 size sheet are finished, this sheet size switching being performed when the facsimile apparatus is in a waiting condition as indicated by a dotted line in FIG. 3A between the two indicated recording periods. Therefore, during this waiting condition of the facsimile apparatus according to the invention, a leading edge of a A4 size sheet is immediately placed on the platen roller 6, a leading edge of the B4 size sheet is retracted, and the facsimile apparatus is set in a ready state for awaiting a call from an external facsimile terminal.

However, in a case of the conventional apparatus as shown in FIG. 3B, a leading edge of the B4 size sheet still remains on the platen roller after the transmission data receiving and sheet recording of the B4 size sheet are finished (refer to the period labelled B4 and indicated by an arrow). The sheet size switching from B4 to A4 size is performed after the next transmission data receiving requiring A4 size paper is started (the period labelled A4 and indicated by an arrow). Therefore, the conventional apparatus requires a longer communication time period than that in the case of the facsimile apparatus of the present invention by a time interval "t" as indicated by an arrow in FIG. 3B since the time required for sheet size switching is included. According to the present invention, it is possible to make the communication time shorter than that of the conventional apparatus, because a recording sheet of the preferential sheet size (which is more frequently used for sheet recording) is always placed on the platen roller 6 and the facsimile apparatus is in a waiting condition for receiving a call from an external facsimile terminal.

In the above described embodiment, which recording sheet, from either the first recording sheet 2 (A4 size) or the second recording sheet 3 (B4 size), should be preferentially placed on the platen roller 6 depends on the number of sheet size occurrences being specified by an external facsimile terminal each time a call is received. However, the present invention is not limited to this embodiment. For example, it is possible to freely change such a preferential sheet size according to the instructions given by an operator who casually operates the facsimile apparatus. Referring next to FIG. 4, a description will be given of a modified control part of the facsimile apparatus which is used for such a case in which the preferential sheet size is determined by the operator.

From an operation part 26 shown in FIG. 4, the operator can give an instruction that specifies the preferential sheet size (the size of first recording sheet 2 or the size of second recording sheet 3) in the ready state of facsimile 1 when waiting for a call. With this control part of the facsimile apparatus 1 including the operation part 26 described above, the input of the operator always allows the change of the preferential sheet size in the ready state when awaiting a call from an external facsimile terminal 27. This enables the reduction of the communication time as well as the cost for telephone line use.

Figure 5:
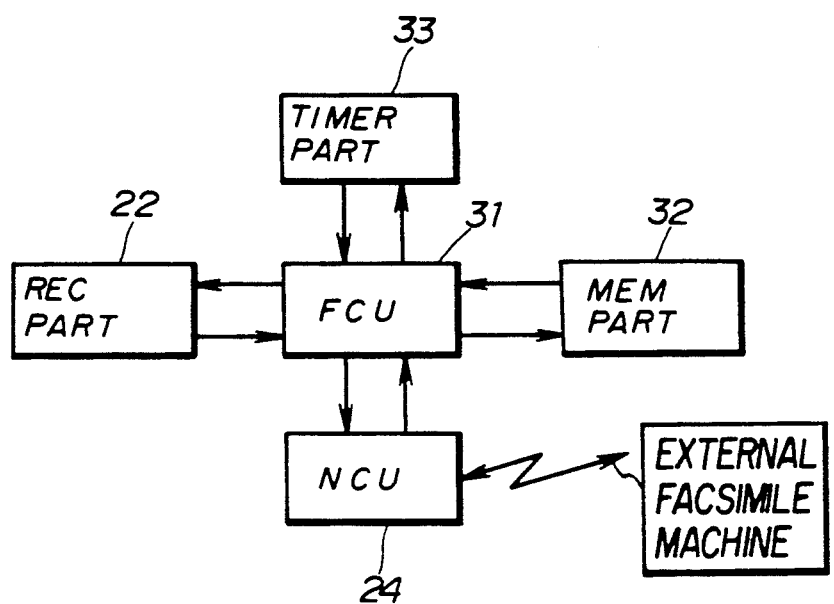
FIG. 5 is a block diagram of a control part of still another embodiment of the present invention.
Figure 7:
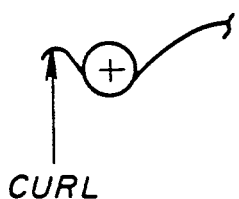
FIG. 7 is a schematic view of the recording sheet with a curled edge due to the awaiting for a long duration at a place between the platen roller and the feed roller.

Next, a description will be given of a second embodiment of the facsimile apparatus according to the present invention, by referring to FIG. 5. FIG. 5 is a block diagram showing a control part of another embodiment of the facsimile apparatus 1. The recording part 22 and the network control unit 24 are the same as those in the first embodiment shown in FIG. 2. A facsimile control unit (FCU) 31 controls several parts of the facsimile to carry out various facsimile functions as well as the recording sheet initialization in accordance with commands from an operating system software within a memory part 32. The memory part 32 is generally made up of a read only memory (ROM) in which an initialization processing program together with the facsimile operation software is stored. A timer part 33 measures a time period for the first recording sheet 2 waiting in a ready state as well as a time period for the second recording sheet 3 waiting in a ready state after the latest use of that sheet. The measured time period for which the recording sheet 2 or 3 continues to wait in a ready state after the newest use of that sheet is ended is hereinafter called a waiting time of the recording sheet. When the waiting time of first recording sheet 2 or the waiting time of second recording sheet 3 exceeds a prescribed time period, the facsimile apparatus carries out initialization of that recording sheet. This prescribed time period is set in the above described timer part 33.

Figure 6A:
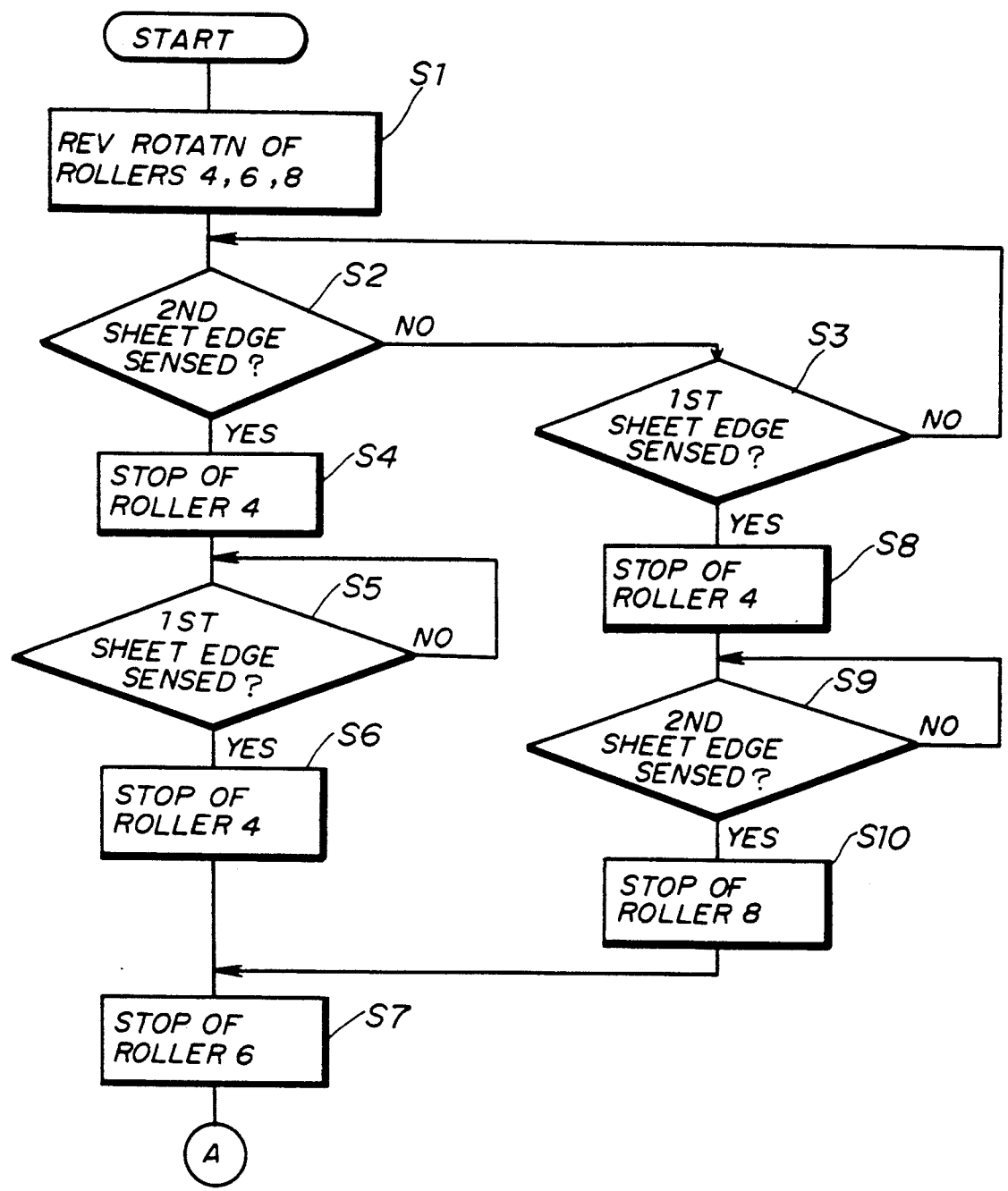
FIGS. 6A and 6B are a flow chart of an initialization of the recording sheet according to the present invention.
Figure 6B:
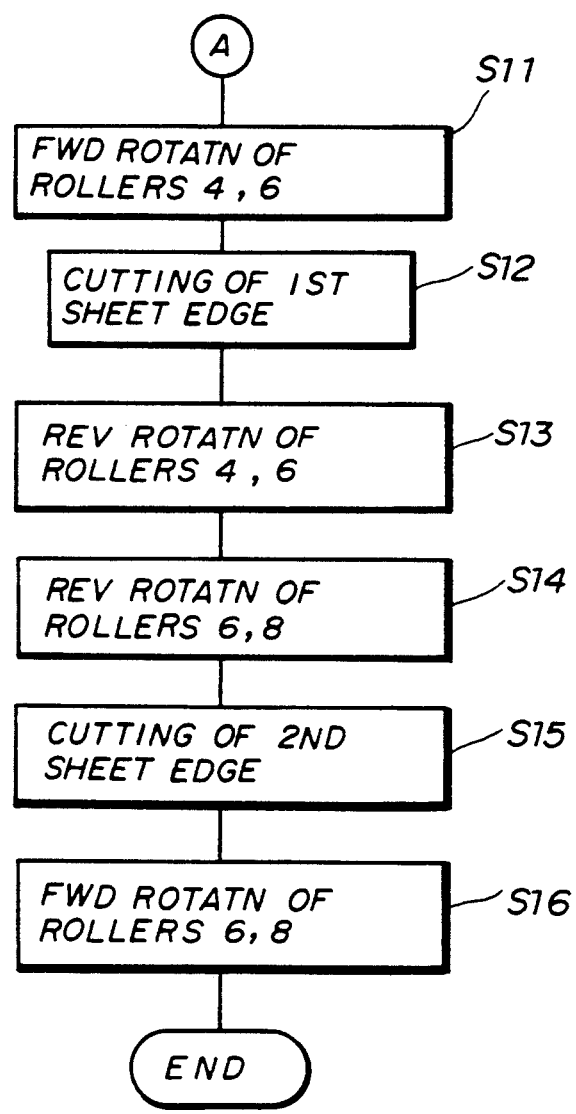

Referring next to FIGS. 6A and 6B, a description will be given of the operation in the recording sheet initialization procedure according to the present invention. In these drawings, it is assumed that the leading edge of first recording sheet 2 is placed on the platen roller 6 and the second recording sheet 3 waits at a prescribed position along the sheet transport path between the second feed roller 8 and the platen roller 6. In a waiting state of the recording sheet in which the recording sheet 2 or 3 continues to stay without being used, once the elapsed time exceeds a prescribed time period set in the timer means 33, the facsimile control unit (FCU) 21 carries out initialization of that recording sheet for either the first recording sheet 2 or the second recording sheet 3.

A step S1 carries out the reverse rotation of the platen roller 6 and the first and second feed rollers 4, 8. As in FIG. 1, the platen roller 6 rotates in a clockwise direction and the feed rollers 4 and 8 rotate in a counterclockwise direction. Steps S2 and S3 check whether the leading edges of the first and second recording sheets 2 and 3 are sensed by the first and second sheet sensors 7 and 10, respectively. If the second sheet sensor 10 senses the leading edge of the second recording sheet 3, then a step S4 stops the reverse rotation of the second feed roller 8. Next, a step S5 checks if the first sheet sensor 7 senses the leading edge of the first recording sheet 2, then steps S6 and S7 stop the reverse rotation of the first feed roller 4 and the platen roller 6, respectively.

A step S3 checks whether the leading edge of the first recording sheet 2 is sensed by the first sheet sensor 7. If the leading edge of the first recording sheet 2 is sensed, then a step S8 stops the reverse rotation of the first feed roller 4. And a step S9 checks whether the leading edge of the second recording sheet 3 is sensed by the second sheet sensor 10. If the leading edge of the second recording sheet 3 is sensed, then a step S10 stops the reverse operation of the second feed roller 8 and the step S7 stops the reverse operation of the platen roller 6.

A step S11 carries out forward rotation of the first feed roller 4 and the platen roller 6 to transport the first recording sheet 2 until the leading edge of the first recording sheet 2 reaches a prescribed position near the cutter 11. In FIG. 1, the first feed roller 4 rotates in a clockwise direction and the platen roller 6 rotates in a counterclockwise direction. A step S12 drives the cutter 11 to cut away the leading edge of the first recording sheet 2. After the cutting of the first recording sheet 2 is finished, a step 13 allows the platen roller 6 and the first feed roller 4 to rotate in the reverse direction so that the leading edge of first recording sheet 2 is fed back to a prescribed position in the first transport path between the first feed roller 4 and the platen roller 6. Next, a step 14 allows the platen roller 6 and the second feed roller 8 to rotate in the forward direction until the leading edge of the second recording sheet 3 reaches a prescribed position near the cutter 11. A step 15 drives the cutter 11 to cut away the leading edge of the second recording sheet 3. After the cutting of the second recording sheet 3 is finished, a step 16 allows the platen roller 6 and the second feed roller 8 to rotate in the reverse direction so that the leading edge of second recording sheet 3 is fed back to a prescribed position in the second transport path between the second feed roller 8 and the platen roller 6. In the case where either the waiting time of first recording sheet 2 or the waiting time of second recording sheet 3 exceeds a prescribed time period, the initialization of that sheet is carried out at given time intervals so as to prevent one recording sheet only from staying at the above described waiting position for an excessively long duration, which often causes the leading edge of that sheet to be curled. Accordingly, at all times, even after a long-duration waiting, the facsimile apparatus of the present invention can operate in the subsequent communication with an external facsimile terminal without suffering a paper jam during the sheet transport process or recording process. In the above described embodiment, the timer part 33 is provided separately from the FCU 31. However, many of the FCUs usually have a timer function and it is not necessary to provide a separate timer means additionally to the facsimile control unit of the facsimile apparatus 1.

Further, the present invention is not limited to these embodiments but various variations and modifications may be made without departing from the scope of the present invention.

What is claimed is:

1. A facsimile apparatus having a control part, first and second rolls of first and second recording sheets of different sheet sizes, a platen roller being driven in conjunction with sheet recording by the control part in order to transport a primary recording sheet selectively being fed from either the first roll or the second roll, a thermal recording head being provided in contact with the platen roller for carrying out thermal recording of said primary recording sheet, a cutter being provided for cutting away a leading edge of said primary recording sheet being fed from the platen roller, a first feed roller being driven by the control part in order to transport the first recording sheet from the first roll to the platen roller, and a second feed roller being driven by the control part in order to transport the second recording sheet from the second roll to the platen roller, said facsimile apparatus comprising:

initialization means for initializing a recording sheet being newly placed in the facsimile apparatus for sheet exchange and putting said newly placed recording sheet at a prescribed position of a sheet transport path in a ready state for receiving a call from an external facsimile terminal; and timer means for measuring a first time interval in which the first recording sheet continuously stays at said prescribed position in a ready state and for measuring a second time interval in which the second recording sheet continuously stays at said prescribed position in a ready state, wherein said facsimile apparatus carries out initialization of a secondary recording sheet selected from either the first recording sheet or the second recording sheet, whichever continues to stay at said prescribed position, after either a respective of said first time interval or said second time interval measured by said timer means exceeds a prescribed time period.

2. A facsimile apparatus as claimed in claim 1, wherein said control part and said initialization means carry out forward and reverse rotations of said platen roller and said first feed roller in order to transport said first recording sheet to a prescribed position of said platen roller when the first time interval exceeds said prescribed time period, so that the first recording sheet does not continuously stay at said prescribed position of said sheet transport path longer than said prescribed time period, and the leading edge of the first recording sheet is cut away by said cutter, thus preventing said leading edge from being curled.

3. A facsimile apparatus as claimed in claim 2, wherein said control part and said initialization means carry out forward and reverse rotations of said platen roller and said second feed roller in order to transport said second recording sheet to said platen roller when the second time interval exceeds said prescribed time period, so that the second recording sheet does not continuously stay at said prescribed position of said sheet transport path longer than said prescribed time period, and the leading edge of the second recording sheet is cut away by said cutter, thus preventing said leading edge of the second recording sheet from being curled.

4. A facsimile apparatus as claimed in claim 1, further comprising:

sensing means, connected to said timer means, for sensing respective positions of said first and second recording sheets.

* * * * *